Feb. 12, 1924.

P. P. DEAN

VALVE

Filed March 12, 1921    3 Sheets-Sheet 1

1,483,081

Inventor:
Peter P. Dean.
By Edwin B. H. Tower Jr.
atty.

Feb. 12, 1924.
P. P. DEAN
VALVE
Filed March 12, 1921
1,483,081
3 Sheets-Sheet 2

Inventor:
Peter P. Dean.
By Edwin B. H. Tower Jr.
Atty.

Feb. 12, 1924.
P. P. DEAN
VALVE
Filed March 12, 1921

Inventor:
Peter P. Dean.
By Edwin B. H. Towne Jr.
atty.

Patented Feb. 12, 1924.

1,483,081

UNITED STATES PATENT OFFICE.

PETER P. DEAN, SOUND BEACH, CONNECTICUT.

VALVE.

Application filed March 12, 1921. Serial No. 451,868.

*To all whom it may concern:*

Be it known that I, PETER P. DEAN, a subject of the King of England, residing at Sound Beach, in the county of Fairfield and State of Connecticut, have invented new and useful Improvements in Valves, of which the following is a specification.

This invention relates to a valve.

It applies particularly to a pivoted gate valve which has these advantages.

The passage therethrough is straight so that the fluid may flow without the retardation produced by a tortuous passage.

The fluid assists in actuating the gate to close the valve and in keeping it firmly seated.

The object of this invention is to provide a pivoted gate valve which will readily stop the flow of fluid in either direction and which may be rapidly closed when emergency requires.

In accordance with this invention two pivoted gates are employed, movable in opposite directions, to be seated to close the valve, one to stop flow in one direction, and the other to stop flow in the other direction. These gates are actuated by means which may close them simultaneously or sequentially, so that when the fluid is flowing, the one which will be assisted by the fluid is actuated and seated first, and may be rapidly closed in the event of an emergency. These means may be driven by an electric motor which is automatically stopped when both valves are seated.

The views of the drawings are:

Figure 2:
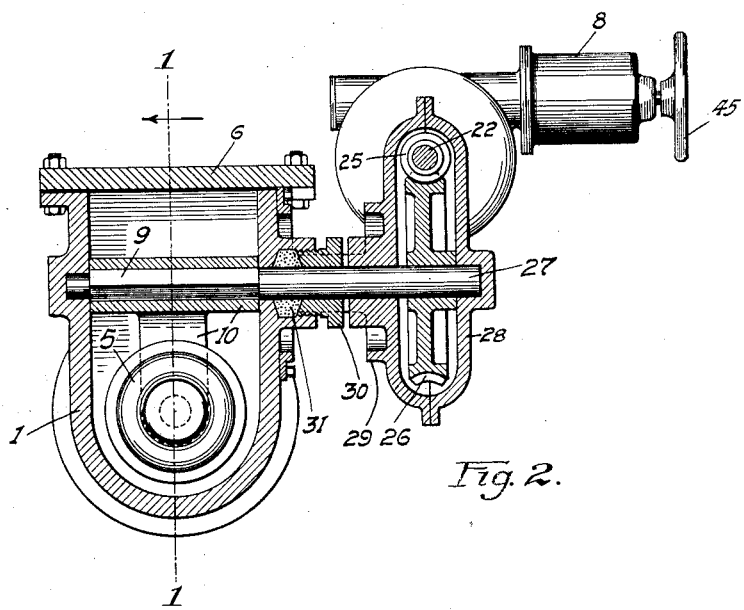
Fig. 2 is an end section of a valve gate and actuating mechanism therefor.
Figure 1:
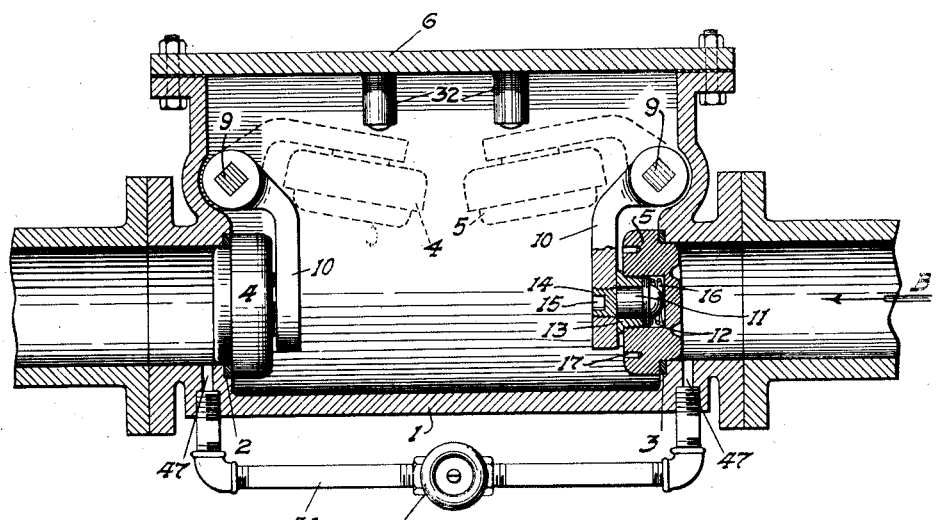
Fig. 1 is a vertical section of a double-gate valve on line 1—1 of Fig. 2.
Figure 3:
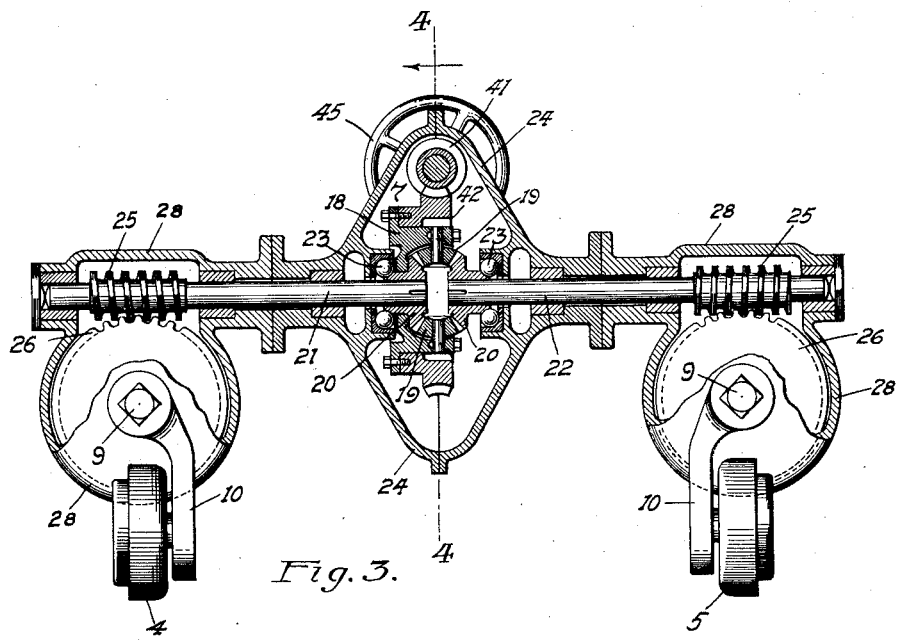
Fig. 3 is a longitudinal vertical section through valve actuating mechanism provided with differential gears.
Figure 4:
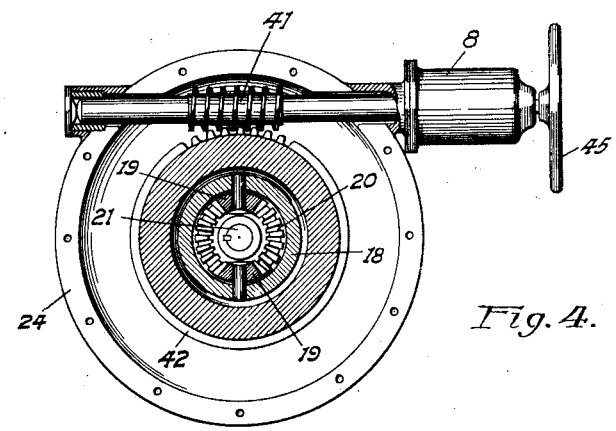
Fig. 4 is a vertical section on line 4—4 of Fig. 3.
Figure 5:
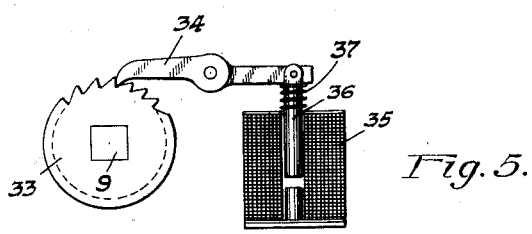
Fig. 5 shows a pawl and ratchet mechanism for holding the valve gates in open position.
Figure 6:
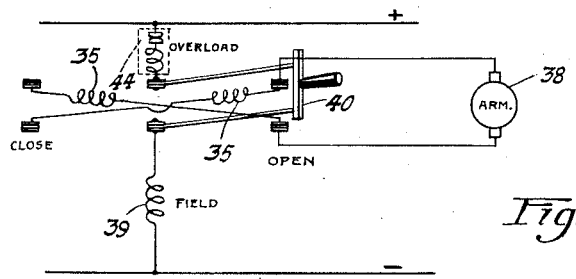
Fig. 6 shows diagrammatically a motor control circuit.

Figs. 1 to 6 inclusive will first be described.

The valve in general comprises a casing 1, seats 2, 3, one at each end thereof, and two pivoted gates 4, 5, one for each seat.

The casing is provided with a cover 6, which may be readily removed to inspect and repair the valve, a gasket being provided between the cover and casing to prevent escape of fluid.

The gates are actuated by means of a differential gear 7, driven by an electric motor 8 or other means.

The gates are fastened to operating shafts 9, by levers 10 and studs 11 carried thereby. The studs extend into central annular receptacles 12 in the gates and are held therein by lock-nuts 13. Each stud is provided with a threaded section 14 and has a square aperture 15 for receiving a tool to draw the stud tightly against the inner face of the gate lever 10. In the annular space 12 is a spring 16 for providing lost motion created by back-lash of the driving gears. If the gates should be forced tightly against the seats 2, 3, there might be a slight backward movement of the gate levers 10 which would be taken up by expansion of the springs 16. Apertures 17 in the gates are for the purpose of receiving a tool to rotate the gates and grind them against the valve seats to resurface the contacting parts.

The differential gear 7 comprises a rotatable spider 18, carrying two driving gears 19, 19 which turn freely on their shafts and mesh with two driven gears 20, 20 keyed to shafts 21 and 22. These shafts revolve in ball bearings 23 arranged in the differential housing 24, and carry near their outer ends worm gears 25, which mesh with worm wheels 26 keyed to extensions 27 of the shafts 9.

A housing 28 for the worm gears 26 and 27 is bolted to the housing 24 and also to the valve casing 1 by a circular flange 29, which is provided with openings through which the stuffing box 30 may be adjusted to tighten the packing 31.

The open position of the valve is when the two gates are in the dotted line position against the back stops 32 (Fig. 1), which allows passage of the fluid straight through the valve without loss of pressure.

Means may be provided to hold the gates in open position. Such means may comprise a ratchet 33 rigidly fastened to the operating shafts 9, and a pawl 34 controlled by an electromagnet 35.

The electromagnet will be energized when the motor circuit is closed to close the valve, and will attract the core or armature 36 against the action of spring 37 and lift the pawl 34 free from the ratchet teeth so as not to interfere with the closing of the valve. However, when the motor circuit is closed to reverse the motor and open the valve the electromagnet will not be energized and consequently the pawl 34 controlled thereby will engage the ratchet teeth and hold the gates open until it is desired to close them.

The motor circuit includes the motor armature 38, motor field 39, and a double throw switch 40 for reversing the motor connections with respect to the main busbars.

Included in series with the motor field is an overload switch 44 for interrupting the motor circuit when the gates are completely seated or when they are opened against the back-stops 32.

Should the motor 8 fail to respond when the switch 40 is closed, the gates may be opened or closed manually by turning the handle 45 which will actuate the worm gears 41 and 42 to operate the gates in the same manner as if the motor fuctioned.

Let it be assumed that steam is flowing in the direction of the arrow B (Fig. 1) and that it is desired to close the valve and cut off the flow. The driving mechanism will be actuated to swing the two gates into engagement with their respective seats. The gate 5, however, will be prevented from turning by the action of the steam holding the gate open, so that the shaft 22 will be held and the pinions 19 will revolve on their shafts and turn the shaft 21 until the gate 4, assisted by the flow, engages the valve seat 2. When the gate 4 is seated and the flow of steam cut off, then the gate 5 will be swung into engagement with its seat 3 by reverse action of the differential gears. When both gates are firmly seated the motor circuit will be interrupted by the overload switch 44.

The differential gear is such that when either gate 4 or 5 is locked or prevented from turning, the other gate will travel at twice the speed that it would if both gates were free. This permits cutting off the flow of liquid in case of an emergency in approximately one-half the time that would be required to close the valve if fluid were not flowing. If the two gates were locked together through ordinary gearing, and either gate were held open by the flow of fluid, the other gate would also be held open so that the valve would fail to shut off the flow.

When the valve is used to control the flow of steam, it is probable that the valve casing will be filled with steam due to leakage at the seats, which will exert considerable pressure on the back surface of one of the gates, depending upon the direction of flow of the steam. This pressure may, in some cases be sufficient to prevent the gates being opened unless the line is first balanced. This may be accomplished by providing a balancing pipe 46 connecting the apertures 47, in the bottom of the valve casing on the inlet and outlet sides of the valve, to thereby balance the pressure in the connecting mains before the gates are opened. This also acts as a safety means to prevent too sudden flow of steam into a cold main. The flow of fluid through the pipe 46 may be regulated by a stop cock 48.

Figure 7:
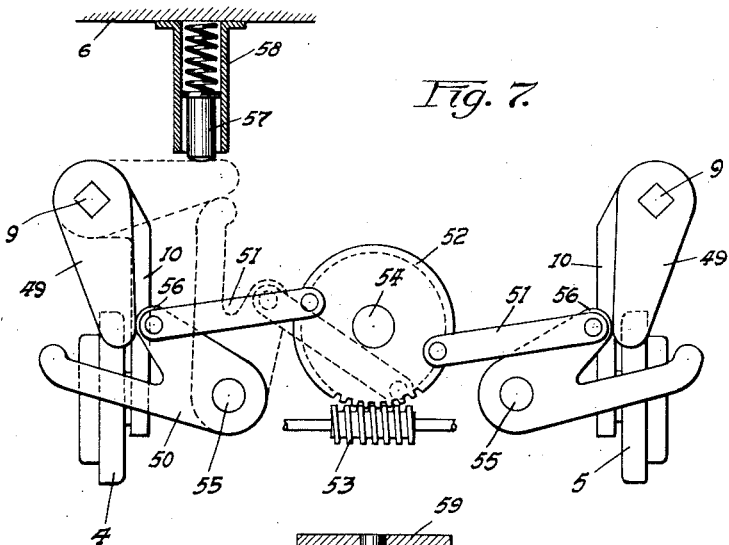
Fig. 7 shows a worm gear and connecting levers for actuating the valve gates.

Fig. 7 will now be described.

Fastened to each of the operating shafts 9 is a cam lever 49 to which power is applied to open the valve gates. Power for actuating the levers 49 is supplied through cam levers 50, links 51, worm wheel 52, and a worm gear 53 driven by a reversible motor, or other means. The wheel 52 and cam levers 50 are mounted on stationary shafts 54 and 55 respectively.

In order to open the valve gates 4, 5, the worm wheel 52 would be rotated in a clockwise direction causing the two links 51 to move the cams upward into the dotted line position. In this position the valve gates will be opened and locked by the rotation of the cams 49 and 50 which are now at approximately right angles to one another.

In order to close the valve, the worm wheel 52 is rotated in a counter-clockwise direction. If fluid is not flowing through the valve, both gates will close simultaneously, but if fluid is flowing at a high velocity, one gate will swing closed and follow the movement of the cam 50, while the opposite gate would probably be held up by the flow of liquid until the other gate were closed or nearly so, when the remaining gate would close by gravity without any means to restrict it. When the gates are closed they are locked in closed position by the arm 56 of cam 50 engaging the cam 49.

When the gates are opened the cams 49 are forced upward until they come in contact with spring pressed plungers 57 mounted in a casing 58 attached to the valve cover 6. The spring pressed plungers serve as back-stops for the cam levers 49, and also assist in initiating the downward movement of the cams 49 when the cams 50 are moved from thereunder.

Figure 8:
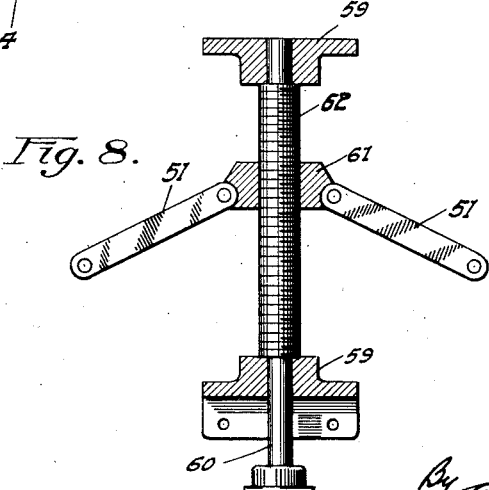
Fig. 8 shows a screw and nut arrangement for opening and closing a pair of valve gates.

Fig. 8 will now be described.

A spindle 62 carrying a traveling nut 61 is held by two bearings 59 and has an extended shaft 60 for attachment to a motor or other driving means. The nut 61 having two projections to which the links 51 are attached moves either up or down when the spindle 62 is rotated and thereby operates the gates 4, 5, through the instrumentality of connecting means such as disclosed in Fig. 7.

The invention contained herein is susceptible of various embodiments and adaptations.

The invention claimed is:

1. A valve having two pivoted gates movable in opposite directions towards the seats thereof to close the same, and means to actuate either gate independently to close first the gate which is assisted in closing by the flowing fluid.

2. A valve having two pivoted gates movable in opposite directions toward the seats thereof to close the same, and means for closing said gates in variable sequential order depending upon the direction of flow of fluid therethrough.

3. A valve having two gates movable in opposite directions toward the seats thereof to close the same, and means for actuating said gates either sequentially or simultaneously, depending upon whether fluid is flowing or not.

4. A valve having two pivoted gates movable in opposite directions toward the seats thereof to close the same, and means including differential gearing to actuate the gates either sequentially or simultaneously and at variable speeds depending upon whether or not fluid is flowing.

5. A valve comprising a casing and two gates therein to control the flow of fluid therethrough, gate actuating shafts journaled in said casing, and means for driving said shafts at variable speeds depending upon whether or not fluid is flowing.

6. A valve having two gates, and means for closing said gates in variable sequential order depending upon the direction of flow of fluid through said valve.

7. A valve having in combination two gates to control the flow of fluid therethrough, and means to close the gates at a predetermined rate of speed when fluid is not flowing and to close one of the gates at a higher rate when fluid is flowing.

8. A valve having in combination two gates to control the flow of fluid therethrough, a motor for closing the gates, means to cause the gates to close in variable sequential order depending upon the direction of the flow of the fluid, a circuit for the motor, and an overload switch in the motor circuit to interrupt the same when both gates are completely closed.

9. In combination a valve, a reversible motor to open and close the valve, a ratchet connected to the valve, a pivoted lever having at one end a pawl to engage the ratchet to hold the valve open, and an electromagnet acting on the pivoted lever to disengage the pawl and ratchet to close the valve when the motor is reversed.

10. A valve having a pivoted gate, means for opening said gate, and electro-magnetic control means for holding said gate in open position.

11. A double gate valve, a reversible motor for opening and closing said valve, a pawl and ratchet for maintaining said valve open, and electro-magnetic means for disengaging said pawl and ratchet to close said valve.

12. In combination, a valve comprising two pivoted gates, and power mechanism for opening and closing said gates, comprising a motor and differential gears.

In witness whereof, I have hereunto subscribed my name.

PETER P. DEAN.